(12) United States Patent
Murayama et al.

(10) Patent No.: US 7,415,573 B2
(45) Date of Patent: Aug. 19, 2008

(54) STORAGE SYSTEM AND STORAGE CONTROL METHOD

(75) Inventors: Koichi Murayama, Kawasaki (JP); Yukinori Sakashita, Sagamihara (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 237 days.

(21) Appl. No.: 11/337,679

(22) Filed: Jan. 24, 2006

(65) Prior Publication Data

US 2007/0113007 A1    May 17, 2007

(30) Foreign Application Priority Data

Nov. 16, 2005    (JP) .............................. 2005-331158

(51) Int. Cl.
*G06F 12/00*    (2006.01)
(52) U.S. Cl. ..................... 711/114; 711/162; 711/165; 711/170
(58) Field of Classification Search ................. None
See application file for complete search history.

(56) References Cited

U.S. PATENT DOCUMENTS

| 7,143,259 B2 * | 11/2006 | Dalal et al. ................. 711/170 |
| 2003/0009619 A1 | 1/2003 | Kano et al. |
| 2006/0090055 A1 * | 4/2006 | Itoh ........................... 711/170 |

FOREIGN PATENT DOCUMENTS

JP    2003-15915    7/2001

* cited by examiner

*Primary Examiner*—Jasmine Song
(74) *Attorney, Agent, or Firm*—Reed Smith LLP; Stanley P. Fisher, Esq.; Juan Carlos A. Marquez, Esq.

(57) ABSTRACT

The storage system of the present invention comprises a plurality of physical storage regions comprising a physical storage region having one or more attributes, and a physical storage region having a plurality of attributes. A prescribed attribute is allocated for each pool constituted from two or more physical storage regions, and each such pool has overlapping physical storage regions, which overlap one another, and non-overlapping physical storage regions, which do not overlap one another. The overlapping physical storage region constitutes two or more pools of the plurality of pools because it has the same plurality of attributes as the plurality of attributes respectively allocated to the plurality of pools, but the non-overlapping physical storage region is not like this, and constitutes only one pool. A controller allocates, to a certain VOL, a non-overlapping physical storage region which is not allocated to this VOL from among a certain pool which is associated to the certain VOL, migrates data inside an overlapping physical storage region which is allocated to this VOL, to the non-overlapping physical storage region, and releases the allocation of the migration-source overlapping physical storage region from this VOL.

20 Claims, 15 Drawing Sheets

| POOL NO. | PREVIOUS USAGE RATE |
|---|---|
| 1 | 90% |
| 2 | 80% |
| 3 | 30% |
| ... | ... |

Ta1

| POOL NO. | ATTRIBUTE | USAGE RATE |
|---|---|---|
| 1 | RAID5 | 90% |
| 2 | FC | 80% |
| 3 | FC AND RAID1 | 30% |
| ... | ... | ... |

Tb2

| LUN | ATTRIBUTE |
|---|---|
| 0 | RAID5 |
| 1 | FC |
| 2 | RAID1 |
| ... | ... |

| DISK ID | DISK TYPE | RAID LEVEL | SEGMENT NO. | START ADDRESS | END ADDRESS | LUN | POOL NO. |
|---|---|---|---|---|---|---|---|
| 0 | SATA | RAID5 | 0 | 0 | 999 | 0 | 1 |
|   |   |   | 1 | 1000 | 1999 | 0 | 1 |
|   |   |   | 2 | 2000 | 2999 | NOT ALLOCATED | ... |
|   |   |   | ... | ... | ... | ... | ... |
| 1 | FC | RAID5 | 5 | 0 | 999 | 0 | 1 |
|   |   |   | 6 | 1000 | 1999 | 1 | 2 |
|   |   |   | ... | ... | ... | ... | ... |
| 2 | FC | RAID5 | 7 | 0 | 999 | 1 | 2 |
|   |   |   | 8 | 1000 | 1999 | 1 | 2 |
|   |   |   | ... | ... | ... | ... | ... |
| 3 | FC | RAID1 | 9 | 0 | 999 | NOT ALLOCATED | ... |
|   |   |   | 10 | 1000 | 1999 | NOT ALLOCATED | ... |
|   |   |   | 11 | 2000 | 2999 | 1 | 2 |
|   |   |   | ... | ... | ... | ... | ... |
| ... | ... | ... | ... | ... | ... | ... | ... |

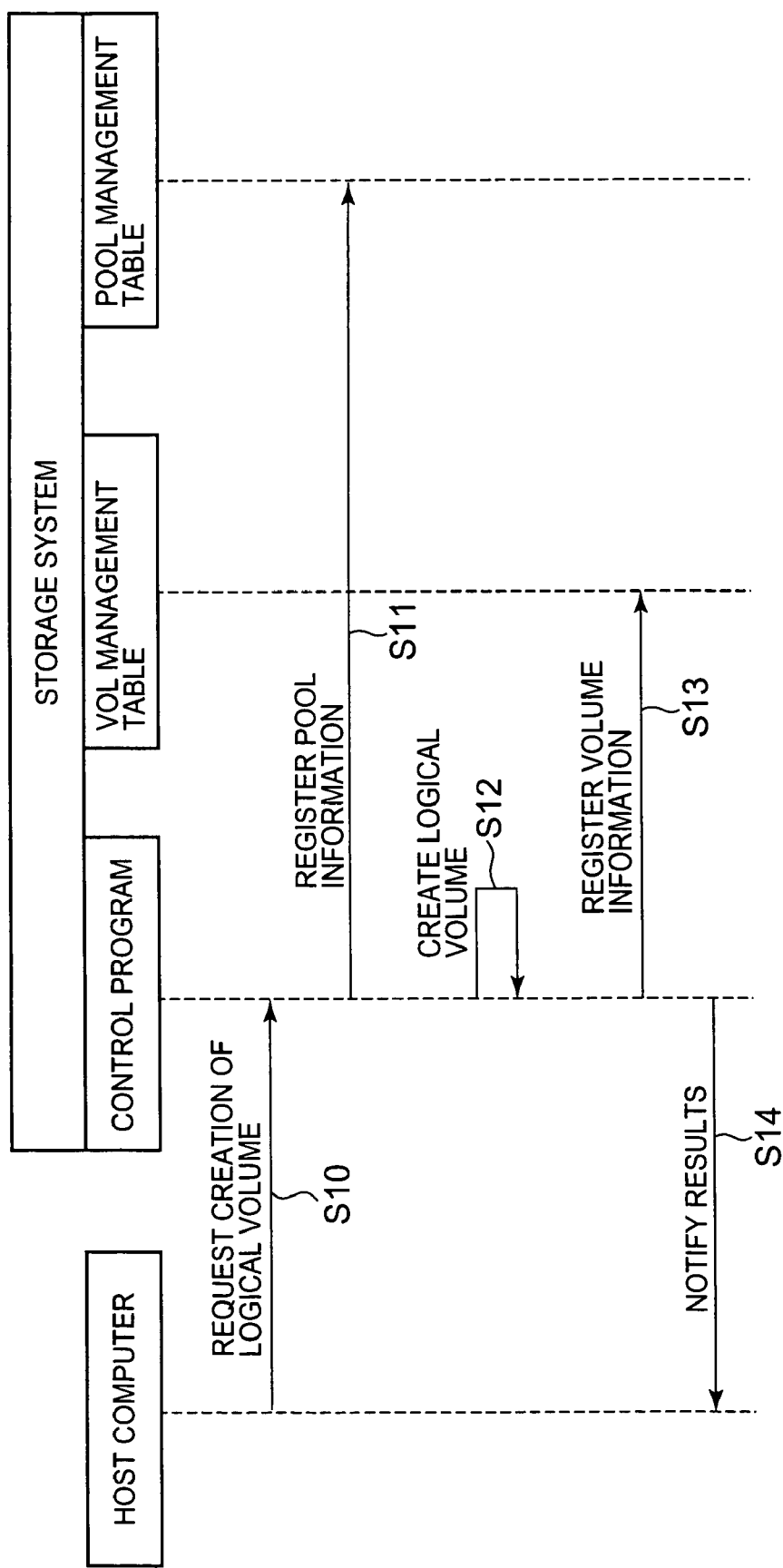

FIG. 15

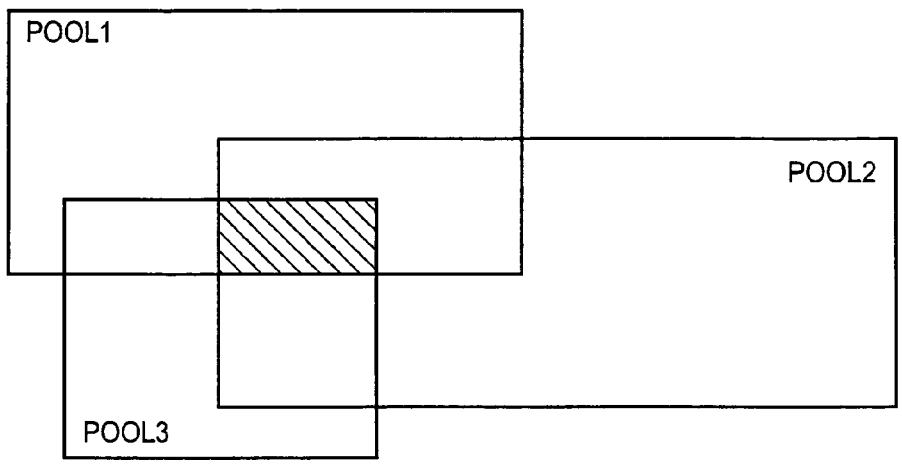

FOR EXAMPLE, WHEN EMPTYING THE
MOST OVERLAPPED REGION IN POOL1:

1) CONFIRM THE EXTENT OF FREE SPACE IN THE NON-OVERLAPPING REGION OF POOL2, AND MIGRATE THE DATA IN THE MOST OVERLAPPED REGION OF POOL1 TO THE NON-OVERLAPPING REGION OF POOL2.

2) CONFIRM THE EXTENT OF FREE SPACE IN THE NON-OVERLAPPING REGION OF POOL3, AND MIGRATE THE DATA IN THE MOST OVERLAPPED REGION OF POOL1 TO THE NON-OVERLAPPING REGION OF POOL3.

STORAGE SYSTEM AND STORAGE CONTROL METHOD

CROSS-REFERENCE TO PRIOR APPLICATION

This application relates to and claims priority from Japanese Patent Application No. 2005-331158, filed on Nov. 16, 2005 the entire disclosure of which is incorporated herein by reference.

BACKGROUND

The present invention relates to storage control technology.

For example, the storage system disclosed in Japanese Laid-open Patent No. 2003-015915 is known. This storage system can expand the storage capacity of a logical volume by dynamically allocating an unused physical storage region of the storage system to a logical volume in accordance with an I/O request from a host.

SUMMARY

A physical storage region, which is allocated to a logical volume, is one of the storage resources of a physical storage device. There are a variety of attributes in a physical storage region. For example, if the physical storage device is a hard disk drive (hereinafter, HDD), the physical storage region attribute is a Fibre Channel (FC), Serial ATA (SATA) or Serial Attached SCSI (SAS). Further, a plurality of physical storage devices is a group, and when this group is a Redundant Array of Independent Inexpensive Disks (RAID) group of a certain level (for example, any of levels 1 through 5), the attribute of the physical storage region is a RAID level.

In the above-mentioned storage system, when a physical storage region is allocated to a logical volume, an unused physical storage region is randomly allocated to a logical volume without consideration for the different attributes of the physical storage region.

An object of the present invention is to provide storage control technology for dynamically allocating a physical storage region to a logical volume.

Other objects of the present invention should become clear from the following explanation.

A storage system according to a first aspect of the present invention comprises a plurality of physical storage regions; a plurality of storage pools comprised from two or more physical storage regions; a plurality of logical volumes respectively associated to the above-mentioned plurality of storage pools; and a controller for receiving a write request for a logical volume from the above-mentioned host, allocating to the above-mentioned logical volume one or more physical storage regions inside a storage pool associated to the above-mentioned logical volume, and writing data in accordance with the above-mentioned received write request to the above-mentioned allocated one or more physical storage regions. The above-mentioned plurality of physical storage regions comprises a physical storage region having one or more attributes, and a physical storage region having a plurality of attributes. A prescribed attribute is allocated to each of the above-mentioned plurality of storage pools, and the above-mentioned plurality of storage pools has overlapping parts, which overlap one another, and non-overlapping parts, which do not overlap with one another. Because the above-mentioned overlapping parts have the same plurality of attributes as the plurality of attributes respectively allocated to a plurality of storage pools, these above-mentioned overlapping parts are an aggregate of overlapping physical storage regions constituting all of the above-mentioned plurality of storage pools. Since the non-overlapping parts of the respective storage pools have attributes, which are allocated to the above-mentioned respective storage pools, but do not have attributes, which are allocated to other storage pools, these non-overlapping parts are an aggregate of non-overlapping physical storage regions, which constitute only the above-mentioned respective storage pools. The above-mentioned controller selects, from among a certain storage pool associated to a certain logical volume, a non-overlapping physical storage region, which is not allocated to the above-mentioned certain logical volume, allocates the above-mentioned selected non-overlapping physical storage region to the above-mentioned certain logical volume, migrates data inside the above-mentioned overlapping physical storage region allocated to the above-mentioned certain logical volume to the above-mentioned selected non-overlapping physical storage region, and removes the allocation of the above-mentioned migration source overlapping physical storage region from the above-mentioned certain logical volume.

In a first mode, the above-mentioned controller (or computer) can receive a specification, from either a user of the above-mentioned host, or a user of another computer, for a storage pool in which space is to be secured. The above-mentioned controller can respond that it received this specification (or respond to a data migration command from the computer, which received this specification), and can execute the migration of the above-mentioned data. In this case, the above-mentioned certain storage pool can be treated as a storage pool, which has the above-mentioned overlapping part with the above-mentioned specified storage pool.

In a second mode, the above-mentioned controller (or computer) can make a determination as to whether or not the number of non-allocated physical storage regions in a storage pool is not more than a prescribed number. The above-mentioned controller can execute migration of the above-mentioned data (or can respond to a data migration command from a computer, which obtained an affirmative determination result) when an affirmative determination result is obtained. In this case, the above-mentioned certain storage pool can be treated as a storage pool having an overlapping part with the above-mentioned storage pool for which the above-mentioned affirmative determination result was obtained.

In a third mode, the above-mentioned controller (or computer) can detect a storage pool in which the number of non-overlapping physical storage regions has increased. The above-mentioned controller can execute migration of the above-mentioned data (or can respond to a data migration command from a computer, which detected this increase in non-overlapping physical storage regions) when this storage pool is detected. In this case, the above-mentioned certain storage pool can be treated as the above-mentioned detected storage pool.

Further, in this third mode, for example, the above-mentioned plurality of physical storage regions can be regions, which are provided in a plurality of physical storage devices. The attribute of each physical storage region can be the same as the attribute of the physical storage device comprising this physical storage region. When a physical storage device is newly installed, the above-mentioned controller (or computer) can detect a storage pool in which the number of non-overlapping physical storage regions has increased based on the attribute of the above-mentioned installed physical storage device.

Further, in this third mode, for example, when the above-mentioned mentioned controller deletes data stored in a non-overlapping physical storage region, the above-mentioned controller (or computer) can detect a storage pool comprising the non-overlapping physical storage region in which the deleted data had been stored as a storage pool in which the number of non-overlapping physical storage regions has increased.

In a fourth mode, the above-mentioned controller (or computer) can determine the height of a trend in a first and second storage pools comprising mutually overlapping parts. In this case, the above-mentioned certain storage pool can be treated as the storage pool, of the above-mentioned first and second storage pools, which was determined to have a low trend.

Furthermore, in this fourth mode, the trend of the above-mentioned second storage pool can be treated as being higher than that of the above-mentioned first storage pool in the case of either (1) or (2) below:

(1) when the usage rate of the above-mentioned second storage pool, which is the ratio of physical storage regions allocated to a group of physical storage regions constituting the above-mentioned second storage pool, tends to be higher than the usage rate of the above-mentioned first storage pool; and (2) when the access frequency for a second logical volume associated to the above-mentioned second storage pool tends to be higher than the access frequency of a first logical volume associated to the above-mentioned first storage pool.

In a fifth mode, the above-mentioned controller can preferentially allocate a non-overlapping physical storage region more than an overlapping physical storage region to the above-mentioned logical volume, from among the storage pools associated to the above-mentioned logical volume.

In a sixth mode, the above-mentioned controller can receive a write request for a logical volume from the above-mentioned host, can preferentially allocate a non-overlapping physical storage region more than an overlapping physical storage region to the above-mentioned logical volume, from among the storage pools associated to the above-mentioned logical volume, and can write data in accordance with the above-mentioned received write request.

A storage control method according to a second aspect of the present invention comprises the steps of receiving from a host a write request for any of a plurality of logical volumes; selecting one or more physical storage regions from a storage pool associated to a logical volume, which constitutes the write destination of data in accordance with the above-mentioned write request; allocating the above-mentioned selected one or more physical storage regions to the above-mentioned data-write-destination logical volume; writing the above-mentioned data to the above-mentioned allocated one or more physical storage regions; selecting from among a certain storage pool associated to a certain logical volume a non-overlapping physical storage region, which is not allocated to the above-mentioned certain logical volume; allocating the above-mentioned selected non-overlapping physical storage region to the above-mentioned certain logical volume; migrating the data inside the above-mentioned overlapping physical storage region allocated to the above-mentioned certain logical volume to the above-mentioned selected non-overlapping physical storage region; and removing the allocation of the above-mentioned migration source overlapping physical storage region from the above-mentioned certain logical volume. This storage control method can be realized using either one or a plurality of storage systems. In other words, a plurality of physical storage regions can be provided inside a single storage system, and a plurality of physical storage regions can be distributed and provided in a plurality of storage systems.

The respective processing carried out by the controller provided in the above-mentioned storage system can be executed either by the respective means or the respective units for performing the respective processing. Either the respective means or the respective units can be realized by hardware circuits, computer programs or a combination of these (for example, either one or a plurality of CPUs into which a plurality of computer programs has been read). Each computer program can be read from a prescribed storage resource (for example, a memory). These computer programs can either be installed on this storage resource via a CD-ROM or other such recording media, or can be downloaded to this storage resource via the Internet or other such communications network.

BRIEF DESCRIPTION OF THE DRAWINGS

FIG. 4 shows an example of a configuration of a segment management table Tb1;

FIG. 6 shows one example of an outline of a sequence at logical volume creation;

FIG. 15 is an illustration of one example of when there is a region in which three or more pools overlap.

DESCRIPTION OF THE PREFERRED EMBODIMENT

A number of embodiments of the present invention will be explained below by referring to the figures. Furthermore, in each embodiment, a physical storage region, which can be dynamically allocated to a logical volume and/or dynamically released from a logical volume will be treated as a "segment," a storage resource component comprising a disk-type storage media.

First Embodiment

Figure 1:
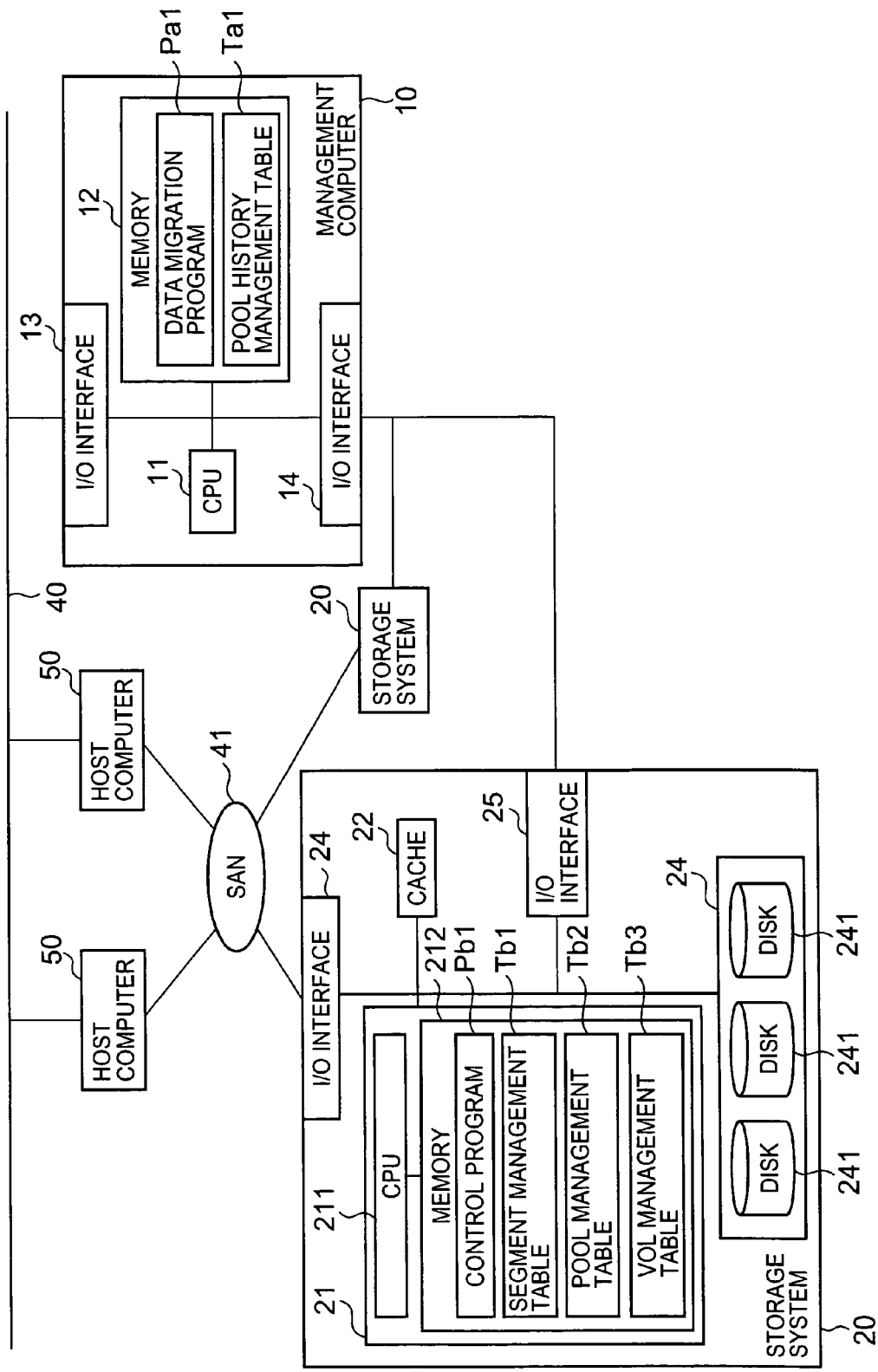
FIG. 1 shows a simplified configuration of a computer system related to a first embodiment of the present invention.

FIG. 1 shows a simplified configuration of a computer system related to a first embodiment of the present invention.

This computer system has a management computer 10; a host computer 50; and a storage system 20. In the example of FIG. 1, there are two host computers 50, and two storage systems 20, but these can be either one unit or three or more units, respectively. The management computer 10, storage system 20 and host computer 50 are connected to a management network (for example, a Local Area Network (LAN)) 40. A host computer 50 is connected to a storage system 20 by way of a data network, for example a Storage Area Network (SAN) 41. A fibre channel or a communication protocol called iSCSI can be utilized in the SAN 41.

The management computer 10 can have either a storage system 20 or a host computer 50 execute a prescribed process by issuing a variety of commands to either a storage system 20 or a host computer 50. More specifically, for example, the management computer 10 can have a storage system 20 create a logical volume, can allocate a logical volume (may be abbreviated as "VOL" hereinbelow) inside a storage system 20 to a host computer 50, and can have a storage system 20 execute data migration. The management computer 10 can comprise a CPU 11, a memory 12, a front-end I/O (input/output) interface 13, and a rear-end I/O interface 14. The CPU 11, memory 12, front-end I/O interface 13, and rear-end I/O interface 14 are interconnected via a bus. The CPU 11 is a processor capable of executing a computer program stored in the memory 12. The memory 12 is a so-called internal storage device, and, for example, can comprise a non-volatile memory for storing a computer program and data, and a volatile memory for temporarily storing the processing results of the CPU 11. The memory 12, for example, can store a data migration program Pa1, and a pool history management table Ta1. The front-end I/O interface 13 is communicatively connected to a host computer 50 via a management network 40. The rear-end I/O interface 14 is communicatively connected to a storage system 20.

A host computer 50 can execute a computer program, such as a database management system (DBMS), and can either write the results of this execution to a storage system 20, or read data from a storage system 20. The hardware configuration of a host computer 50 can be substantially the same configuration as that of the management computer 10, and as such, a drawing and explanation of this configuration will be omitted here.

A storage system 20, for example, is a disk array comprising an arrayed plurality of disk devices 241. A storage system 20 can comprise a disk array controller 21, a cache memory 22, I/O interfaces 24, 25, and a plurality of disk devices 241.

The disk array controller 21 is a device for controlling the operation of a storage system 20, and can be constituted from either one or a plurality of circuit substrates. The disk array controller 21 can comprise a CPU 211, a memory 212, and an I/O port (not shown in the figure). The memory 212, for example, can store a control program Pb1, a segment management table Tb1, a pool management table Tb2, and a VOL management table Tb3.

The cache memory 22 can temporarily store data to be written to a disk device 241, or data to be read from a disk device 241.

The I/O interface 24 is communicatively connected to a host computer 50 via a SAN 41. The I/O interface 25 is communicatively connected to the management computer 10.

The respective disk devices 241, for example, are HDD, but they can also be Digital Versatile Disks (DVD) or some other type of storage media disks. A logical volume (This can also be called a logical unit (LU).), which is either one or a plurality of logical storage devices, can be provided by virtue of a plurality of HDD 241.

The preceding is an explanation of a simplified configuration of a computer system. Next, a program and table stored in the memory 12 of the management computer 10 will be explained.

Figures 2A, 2B:
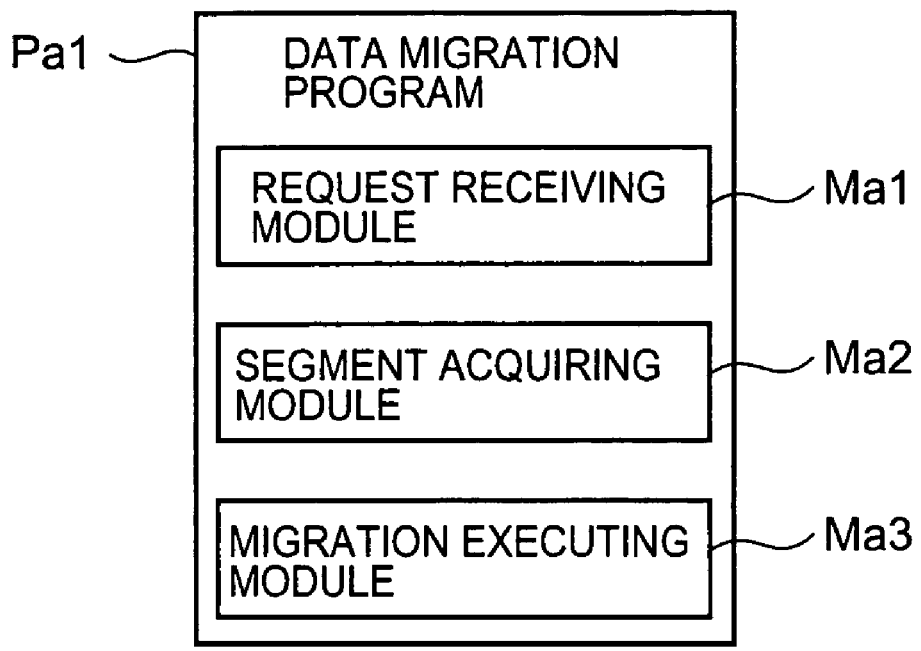
FIG. 2A shows an example of a configuration of a data migration program Pa1.
FIG. 2B shows an example of a configuration of a pool history management table Ta1.

FIG. 2A shows an example of a configuration of a data migration program Pa1.

The CPU 11, which reads in and executes the data migration program Pa1 (hereinafter, for the sake of expediency, referred to as data migration program Pa1), can determine data to be migrated (migration-targeted data) and a migration-destination segment, and can send a data migration command, which is a command for migrating this data to this segment, to a storage system 20. The data migration program Pa1 comprises a request receiving module Ma1, a segment acquiring module Ma2, and a migration executing module Ma3.

The request receiving module Ma1 receives a migration request from a user (for example, the operator of the management computer 10 or host computer 50), and communicates this request to the migration executing module Ma3. As used here, "migration request" is a request to secure free capacity in a segment belonging to a certain pool. Further, a "pool" is a storage resource, which is constituted from a number of segments dynamically allocated to and released from a logical volume. A detailed explanation of a pool will be given hereinafter.

The segment acquiring module Ma2 communicates with a storage system 20, and acquires information related to a segment of the storage system 20, and information related to a logical volume.

The migration executing module Ma3 responds to a migration request communicated from the request receiving module Ma1, and, based on the information group acquired by the segment acquiring module Ma2, determines the data to be migrated and the migration-destination segment, generates a data migration command for migrating this data to this segment, and sends this data migration command to the storage system 20.

FIG. 2B shows an example of a configuration of a pool history management table Ta1.

A pool history management table Ta1 is a table for managing log information related to a pool managed by a storage system 20. For example, a "pool number" and "previous usage rate" are recorded in the pool history management table Ta1 for each pool. The "pool number" is an ID assigned by the storage system 20 for uniquely identifying a pool. The "previous usage rate" is a value representing the usage rate of a pool, which the data migration program Ta1 acquired from the storage system 20 the time previous to this. This usage rate indicates the ratio of the number of segments allocated to a logical volume relative to the total number of segments constituting a pool. In this embodiment, it is supposed that the size of a segment is fixed, and that all segments are the same size.

The preceding is an explanation of a program and table stored in the memory 12 of the management computer 10. Next, a program and table stored in the memory 212 of the disk array controller 21 will be explained.

Figures 3A, 3B, 3C:
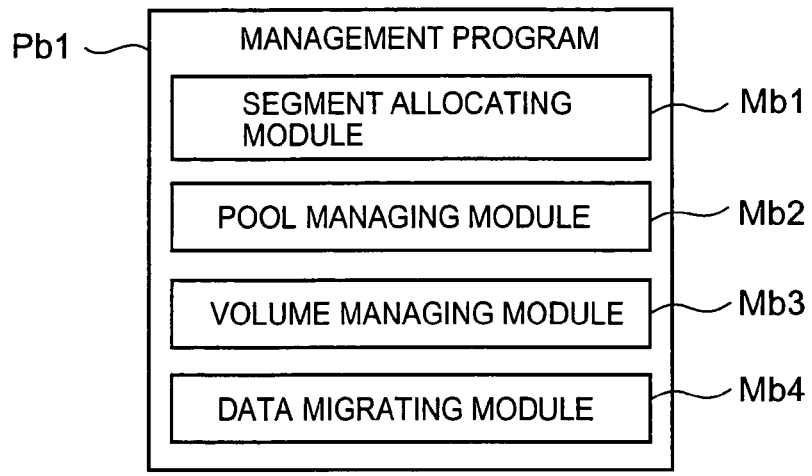
FIG. 3A shows an example of a configuration of a control program Pb1.
FIG. 3B shows an example of a configuration of a pool management table Tb2.
FIG. 3C shows an example of a configuration of a volume management table Tb3.

FIG. 3A shows an example of a configuration of a control program Pb1.

The CPU 211, which reads in and executes the control program Pb1 (hereinafter, for the sake of expediency, referred to as control program Pb1), controls the operation of a storage system 20. The control program Pb1, for example, can execute the allocation of a logical volume, and the migration of data. The control program Pb1 comprises a segment allocating module Mb1, a pool managing module Mb2, a volume managing module Mb3, and a data migrating module Mb4.

The segment allocating module Mb1 can create a logical volume, and/or dynamically allocate a segment to a logical volume. Further, the segment allocating module Mb1 can communicate information related to a logical volume to the pool managing module Mb2 and volume managing module Mb3.

The pool managing module Mb2 can group segments and manage them as a pool for each specified attribute. Information related to a pool is registered in a pool management table Tb2. As segment attributes capable of being specified when a pool is created, for example, there are disk type, such as FC and SATA, RAID level, and vendor. When a pool is created, a single attribute can be specified, or a plurality of attributes can be specified. This attribute specification can be done by a user, or it can be done by the pool managing module Mb2 acquiring information related to a disk device 241 (for example, the vendor or disk type) from the disk device 241.

The volume managing module Mb3 can manage the relationships among a segment, logical volume and pool.

The data migrating module Mb4 can migrate specified data to a specified segment.

FIG. 3B shows an example of a configuration of a pool management table Tb2.

The pool management table Tb2 is a table for managing a pool, and, more specifically, for example, records a "pool number", "attribute" and "usage rate" for each pool. The "pool number" is an ID assigned by the pool managing module Mb2 for uniquely identifying a pool. The "attribute" shows the attribute of a segment, which belongs to a pool. The "usage rate" differs from the above-mentioned "previous usage rate" in that it represents the most recently acquired usage rate.

FIG. 3C shows an example of a configuration of a VOL management table Tb3.

The VOL management table Tb3 is a table for managing a VOL, and more specifically, for example, records a "LUN" and "attribute" for each VOL. Based on this attribute, and the attribute registered in the pool management table Tb2, it becomes possible to determine which pool segment should be allocated to which logical volume.

FIG. 4 shows an example of a configuration of a segment management table Tb1.

The segment management table Tb1 is a table for managing a segment. More specifically, for example, the segment management table Tb1 records, for each disk device 241, a "disk ID" for uniquely identifying a disk device 241 in a storage system 20, a "disk type", which is the type of a disk device 241, and a "RAID level" of a RAID Group in which a disk device 241 constitutes a component. Further, a number of segments exist on each disk device 241 disk, and the segment management table Tb1 records, for each segment, a "segment number" for identifying a segment, a "start address" and an "end address" depicting the range of a segment, a "LUN" (logical unit number), which is an ID for uniquely identifying a logical volume to which a segment is allocated, and a "pool number" of a pool to which a segment belongs. When a segment is allocated to a logical volume, the respective "LUN" and "pool number" corresponding to this segment are recorded, but when this segment is not allocated to a logical volume, information signifying that this segment has not been allocated (for example, "not allocated" as shown in the figure) is recorded in the fields for the "LUN" and "pool number" corresponding to this segment.

According to FIG. 4, for example, it is clear that the segment having segment number "0" has both SATA and RAID5 as attributes, and is allocated to a logical volume having a LUN of "0" as a segment belonging to a pool having the pool number "1". Furthermore, in this embodiment, the fact that the segment has been allocated means that data is stored in this segment, and conversely, the fact that a segment is not allocated means it is free and there is no data stored in the segment.

The preceding is an explanation of a program and tables stored in the memory 212 of the disk array controller 21.

Incidentally, the migration of data is performed as needed in this first embodiment. Overviews of a number of examples of this data migration will be explained below.

Figure 5A:
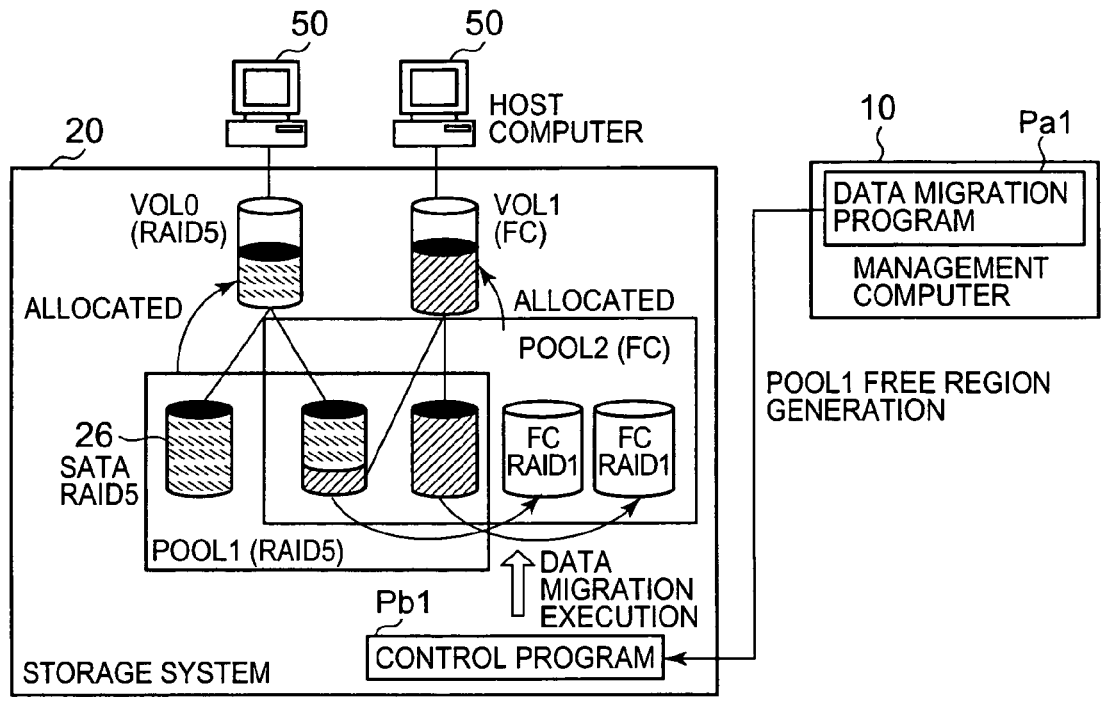
FIG. 5A shows one example of an overview of a data migration process carried out by a first embodiment of the present invention.

FIG. 5A shows one example of an overview of a data migration process performed by the first embodiment of the present invention.

Before explaining data migration, the relationship between a logical volume and a pool in a storage system 20 will be explained by referring to this FIG. 5A.

A storage system 20 has a plurality of logical volumes and a plurality of pools. A logical volume is a logical storage device provided by a host computer 50, and can be disposed on one or a plurality of disk devices 241. When a write request is issued to a logical volume, and the need arises to store new data in this logical volume, a segment is selected from a pool, which has the same attribute as the attribute allocated to this logical volume, and allocated to this logical volume, and this data is stored in this allocated segment.

An attribute is allocated to each logical volume. More specifically, for example, it is supposed that "RAID5" is allocated as an attribute to the logical volume having the LUN "0" (hereinafter, VOL0), and that "FC" is allocated as an attribute to the logical volume having the LUN "1" (hereinafter, VOL1). Thus, a segment having the attribute "RAID5" is allocated to VOL0, and a segment having the attribute "FC" is allocated to VOL1.

An attribute, which is set in the pool management table Tb2 (refer to FIG. 3B), is assigned to each pool. More specifically, for example, the attribute "RAID5" is set in the pool having the pool number "1" (hereinafter, pool1). This signifies that a segment having the RAID5 attribute can belong to pool1 no matter what other attribute this segment has. Further, the attribute "FC" is set in the pool having the pool number "2" (hereinafter, pool2). This signifies that a segment having the FC attribute can belong to pool2 no matter what other attribute this segment has.

Each of pool1 and pool2 has overlapping parts, which overlap one another, and non-overlapping parts, which do not overlap with one another. In concrete terms, among the numerous segments inside a storage system 20, there is a segment, which can only belong to either pool1 or pool2 (hereinafter, non-overlapping segment), and a segment, which can belong to both pool1 and pool2 (hereinafter, overlapping segment). More specifically, for example, a segment having the attributes "SATA" and "RAID5" is a non-overlapping segment in pool1, a segment having the attributes "FC" and "RAID1" is a non-overlapping segment in pool2, and a segment having the attributes "FC" and "RAID5" is an overlapping segment, which has attributes that can be allocated to both pool1 and pool2.

Thus, in an environment in which overlapping segments and non-overlapping segments coexist, and overlapping segments are capable of being allocated to a larger number of logical volumes than the non-overlapping segments, if the dynamic allocation and release of segments is carried out without regard for segment attributes, an overlapping part, which is comprised from a plurality of overlapping segments, will most likely diminish faster than a non-overlapping part, which is comprised from a plurality of non-overlapping segments. The diminishing of the overlapping part means that the storage capacity of the plurality of pools having this overlapping part is exhausted at the same time.

As a method for solving this, a non-overlapping segment can be allocated on a priority basis, and when the number of non-overlapping segments becomes small or zero, an overlapping segment can be allocated. However, even if this is done, for example, when the capacity of a certain pool is augmented by the addition of a new disk device 241, or when data is deleted from a location corresponding to a non-overlapping segment of a logical volume, this could generate an abundance of non-overlapping segments and a dearth of overlapping segments.

Accordingly, in this embodiment, as illustrated in FIG. 5A, processing is carried out as needed to migrate data from inside an overlapping segment to a non-overlapping segment so as to empty the overlapping segment.

More specifically, for example, when the number of segments capable of being allocated to VOL0, which corresponds to the attribute "RAID5", is not more than a prescribed number, the data migration program Pa1 of the management computer 10 issues a command to the control program Pb1 of the storage system 20 to generate a free region in pool1. By so doing, the control program Pb1 searches among-the overlapping segments belonging to pool1 and pool2 for the overlapping segment allocated to VOL1, which has the same "FC" attribute as pool2, and migrates the data inside this overlapping segment to a non-overlapping segment in pool 2. This creates free space in the overlapping segment, resulting in an increase of segments capable of being allocated to VOL0.

Figure 5B:
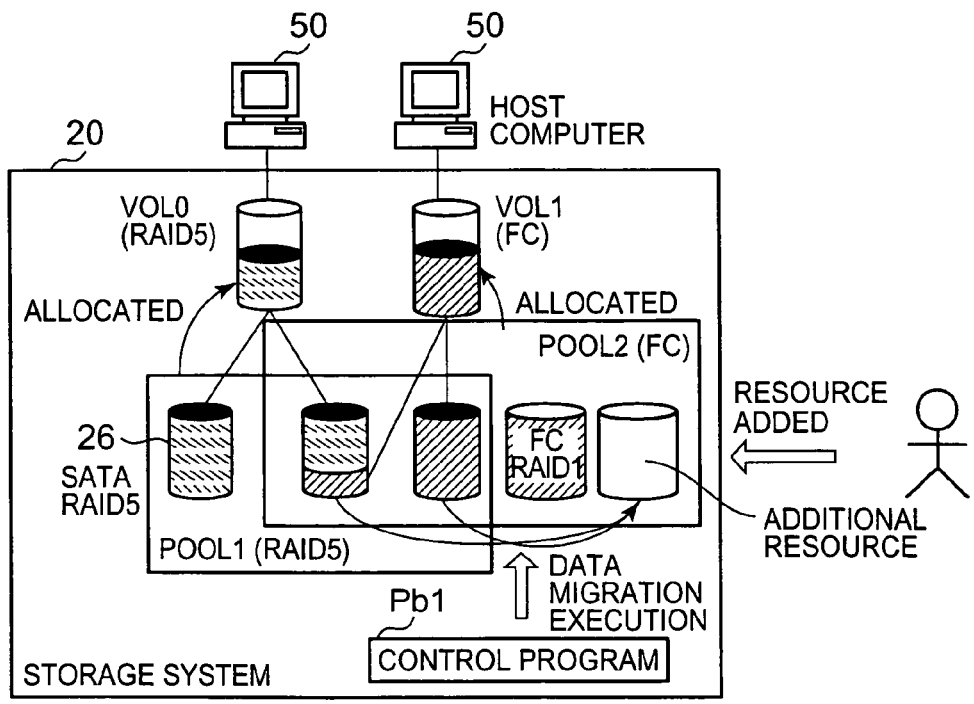
FIG. 5B shows another example of an overview of a data migration process carried out by a first embodiment of the present invention.

FIG. 5B shows another example of an overview of data migration carried out by the first embodiment of the present invention.

Data migration can be carried out even when the number of non-overlapping segments of a pool increase. The number of non-overlapping segments of a pool can increase, for example, when one or more segments, which already exist inside a storage system 20, and which do not belong to any pool, are added to a certain pool, and when a disk device 241 is newly added.

More specifically, for example, it is supposed that an FC disk device 241, which comprises a RAID1 RAID group, is newly added to a storage system 20. By so doing, the number of non-overlapping segments of pool2, which has an "FC" attribute, increases. More specifically, for example, information related to the newly added disk device 241 is added to the segment management table Tb1.

The control program Pb1 of the storage system 20 determines, at a prescribed timing (for example, when it detects the addition of a disk device 241), whether or not the non-overlapping segments of the respective pools have increased, and when it is determined that they have increased, the data inside the overlapping segment can be migrated to the augmented non-overlapping segment.

The processing carried out by this first embodiment will be explained in more detail below.

In this embodiment, in order to utilize segments efficiently by allocating segments to a logical volume, which is expanded on the basis of user-specified conditions, and curbing the exhaustion of segments in a storage system 20, a variety of processing is executed, such as logical volume creation processing, segment allocation processing, data migration processing for increasing the free space regions in a specified pool, and data migration processing for when a free space region occurs in a region, which does not overlap with another pool. Each process can be operated independently without dependency.

The sequence among modules in logical volume creation processing will be explained by referring to FIG. 6.

In a logical volume creation process, a logical volume, which corresponds to user-specified conditions, is newly created.

A host computer 50, in accordance with a user operation, requests the control program Pb1 to create a logical volume (Step S10). The attribute of a logical volume-allocatable segment is included in the logical volume creation request.

The control program Pb1, which received the request, executes the pool managing module Mb2, and registers a pool with a user-specified attribute in the pool management table Tb2 (Step S11). Next, the control program Pb1 executes the segment allocating module Mb1, and creates a logical volume having the user-specified attribute (Step S12). The control program Pb1 also executes the volume managing module Mb3, and registers information related to the logical volume in the VOL management table Tb3 (Step S13). When the above processing is complete, the control program Pb1 notifies the host computer 50 of the processing results (Step S14).

Figure 7:
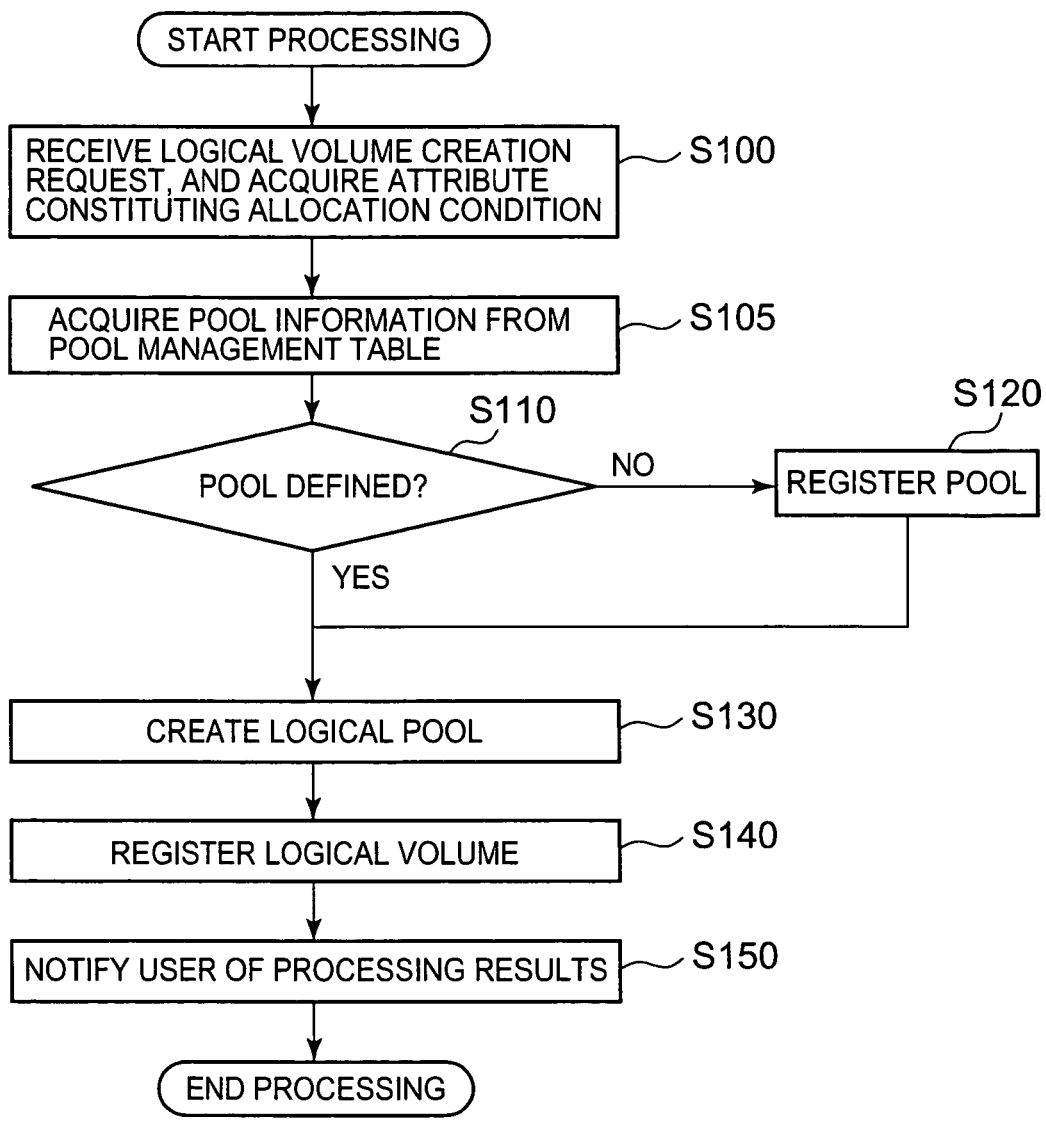
FIG. 7 shows one example of the processing flow at logical volume creation.

Next, the detailed processing flow at logical volume creation will be explained by referring to FIG. 7.

When the control program Pb1 receives a request from a host computer 50 to create a logical volume, it acquires from this creation request the attribute for allocating a segment to a logical volume (Step S100).

Next, the control program Pb1 executes the pool managing module Mb2, acquires a pool number and attribute from the pool management table Tb2 (Step S105), and determines whether or not there is a pool with the same attribute as the attribute acquired from the above-mentioned creation request (Step S110).

When a corresponding pool is found (Step S110: Yes), the control program Pb1 proceeds to the logical volume creation process. Conversely, when a corresponding pool is not found (Step S110: No), the control program Pb1 executes the pool managing module Mb2, and newly registers a pool having the attribute acquired from the above-mentioned creation request (Step S120).

Thereafter, the control program Pb1 executes the segment allocating module Mb1 to create a logical volume (Step S130), and registers information related to the logical volume in the VOL management table Tb3 (Step S140). When the above-mentioned processing is complete, the control program Pb1 notifies the user of the processing results (Step S150).

The preceding is one example of the flow of processing for creating a logical volume. Furthermore, in this processing, the control program Pb1 can create pools in accordance with a user's request prior to creating a logical volume, and when the logical volume is created, the user can select a pool associated to the logical volume from among the pools created in advance.

Figure 8:
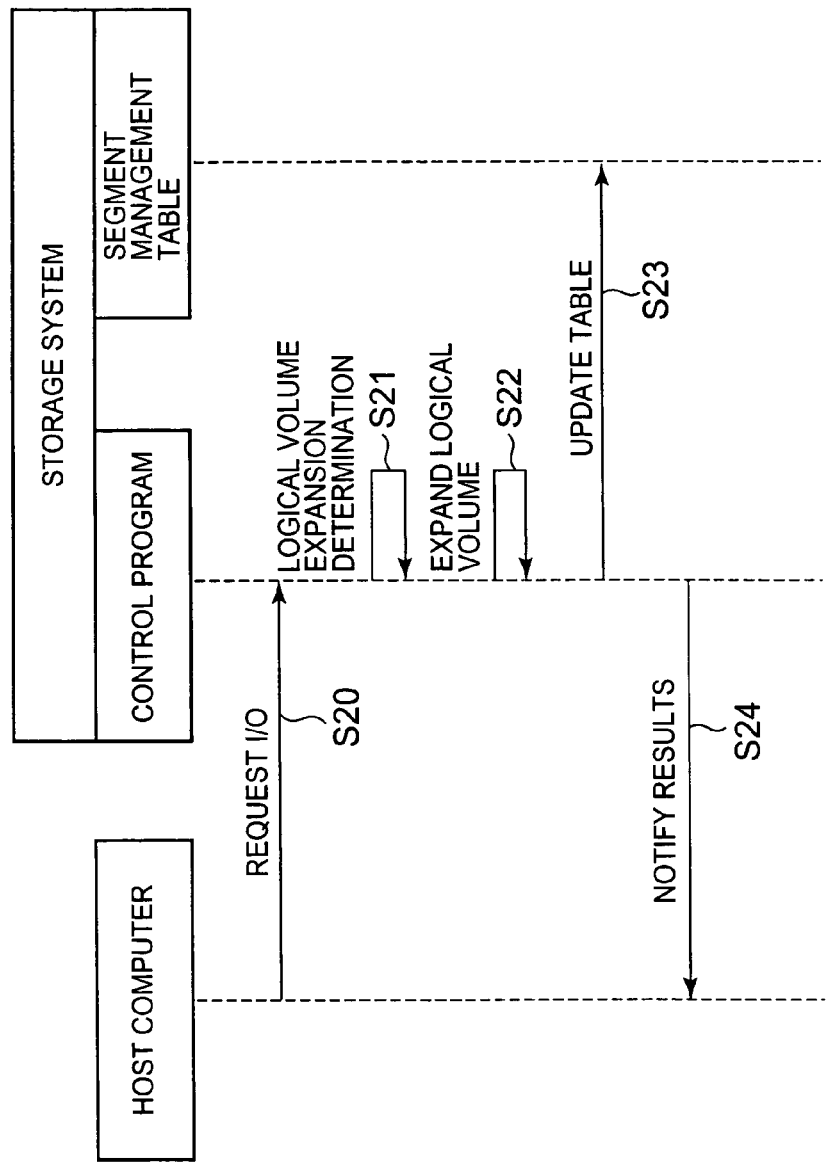
FIG. 8 shows one example of an outline of a sequence for segment allocation processing.

Next, segment allocation processing will be explained by referring to FIG. 8.

The control program Pb1 can expand the capacity of a logical volume by dynamically allocating a segment to a logical volume in response to an I/O request (a write request, in particular) from a host computer 50.

The control program Pb1 receives an I/O request from a host computer 50 (Step S20), and determines whether or not it is necessary to expand a logical volume (Step S21). More specifically, for example, when the address of the logical volume accessed by the I/O request specifies an address, which is beyond the scope of the address of a segment allocated to the logical volume, the control program Pb1 makes a determination to execute logical volume expansion.

When it has been decided to expand a logical volume, the control program Pb1 executes the segment allocating module Mb1 to expand a logical volume (Step S22). In line with expanding the logical volume, the information in the segment management table Tb1 is updated (Step S23), and the results of processing are notified to the host computer (Step S24).

Figure 9:
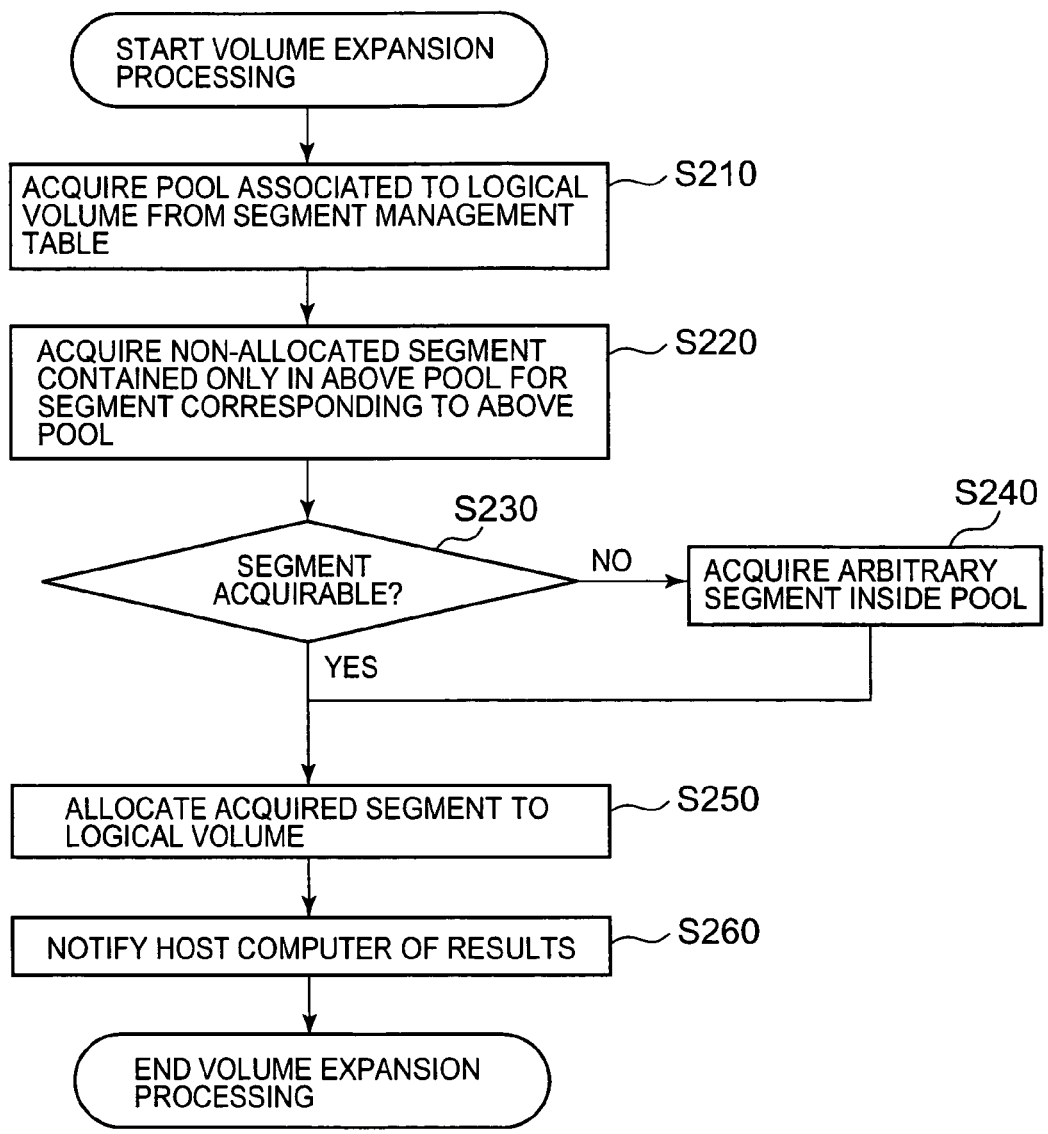
FIG. 9 shows one example of the flow of segment allocation processing.

Next, segment allocation processing and logical volume expansion will be explained in detail by referring to FIG. 9.

The control program Pb1 executes the volume managing module Mb3, and, by acquiring from the segment management table Tb1 the pool number corresponding to the LUN of a logical volume for which capacity is to be expanded, specifies a pool associated to this logical volume (Step S210).

Next, the control program Pb1 acquires, from the segments corresponding to the above-mentioned pool, a non-allocated segment, which is contained only in the above-mentioned pool (in other words, a non-allocated non-overlapping segment) (Step S220). More specifically, for example, the control program Pb1 executes the pool managing module Mb2, acquires the attribute corresponding to the pool number acquired from the pool management table Tb2 in Step S210, executes the segment managing module Mb1, and acquires from the segment management table Tb1 a list of segment numbers, which satisfy this attribute. Next, the control program Pb1 carries out the same processing for a pool having a pool number other than the one acquired, and deletes from the above-mentioned acquired segment number list the segment number belonging to the pool other than the pool specified by the above-mentioned pool number. The segment number list remaining as a result of this is the segment, which belongs only to the pool specified by the pool number acquired in Step S210. Explaining this based on the respective tables Tb1 and Tb2 shown in FIG. 3B and FIG. 4, when the LUN of the logical volume targeted for expansion is "0", a segment contained only in pool 1 is a RAID5 attribute, and is not an "FC" attribute segment. In this case, the corresponding non-allocated segment constitutes the segment of segment number "2".

According to the above-mentioned processing, when there is a targeted segment, that is, when the segment number list has one or more segment numbers (Step S230: Yes), the control program Pb1 allocates this segment to the logical volume (Step S250). Conversely, when there is no targeted segment (Step S230: No), the control program Pb1 acquires an arbitrary segment belonging to a corresponding pool, and allocates it to the logical volume (Steps S240 and S250).

Thereafter, the control program Pb1 notifies the host computer of the results (Step S260).

The preceding is one example of the flow of processing at segment allocation. Furthermore, for example, an arbitrary segment is allocated in Step S240, but a segment can also be allocated using some other algorithm as well.

Figure 10:
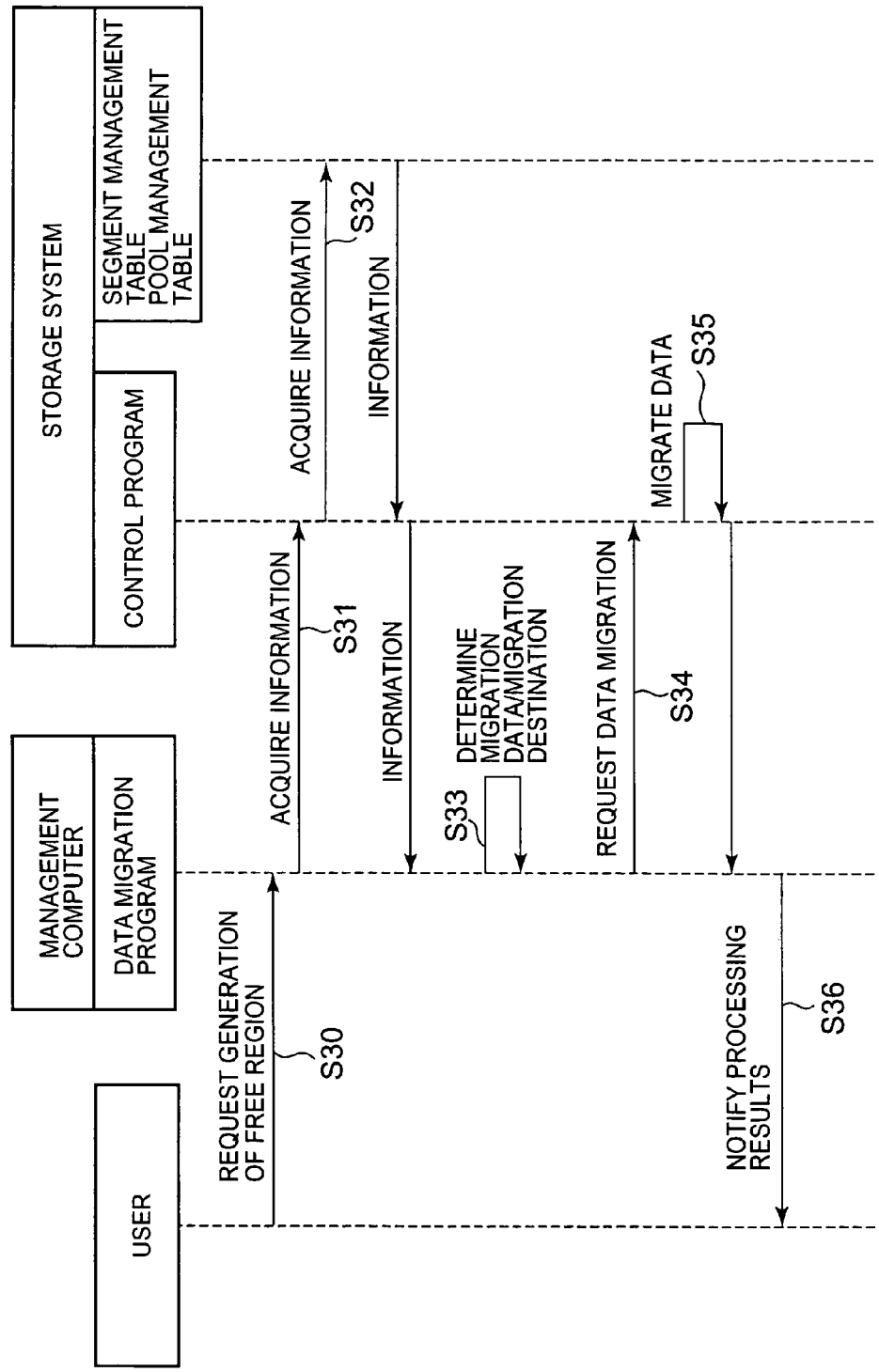
FIG. 10 shows one example of an outline of a sequence for data migration processing.

Next, the sequence of data migration processing will be explained by referring to FIG. 10. This process is one that is executed when there is insufficient capacity in one pool, and excessive capacity in another pool.

When a user (for example, the operator of a host computer or the management computer 10) requests the data migration program Pa1 of the management computer 10 to generate a free region in a pool (Step S30), the data migration program Pa1 acquires various information recorded in the segment management table Tb1 and pool management table Tb2 from the control program Pb1 of the storage system 20 (Steps S31 and S32).

Next, the data migration program Pa1, on the basis of the acquired various information, determines the data to be migrated and the data migration destination segment (Step S33), and requests the control program Pb1 of the storage system 20 to migrate the data (Step S34).

The control program Pb1, which received the request, responds to this request, executes data migration (Step S35), and returns the processing results to the data migration program Pa1. In accordance therewith, the user is notified of the processing results by the data migration program Pa1 (Step S36).

Data migration processing is executed by the data migrating module Mb4 of the control program Pb1. The data migrating module Mb4 acquires, from either the invoker or the module, the segment number of the segment in which the migration-targeted data is stored, and the segment number of the segment, which constitutes the data migration destination. Then, the data migrating module Mb4 copies the data stored in the migration source segment to the migration destination segment, and after copying ends normally, it can either initialize or release the migration source segment, and notify either the invoker or the module of the processing results.

Figure 11:
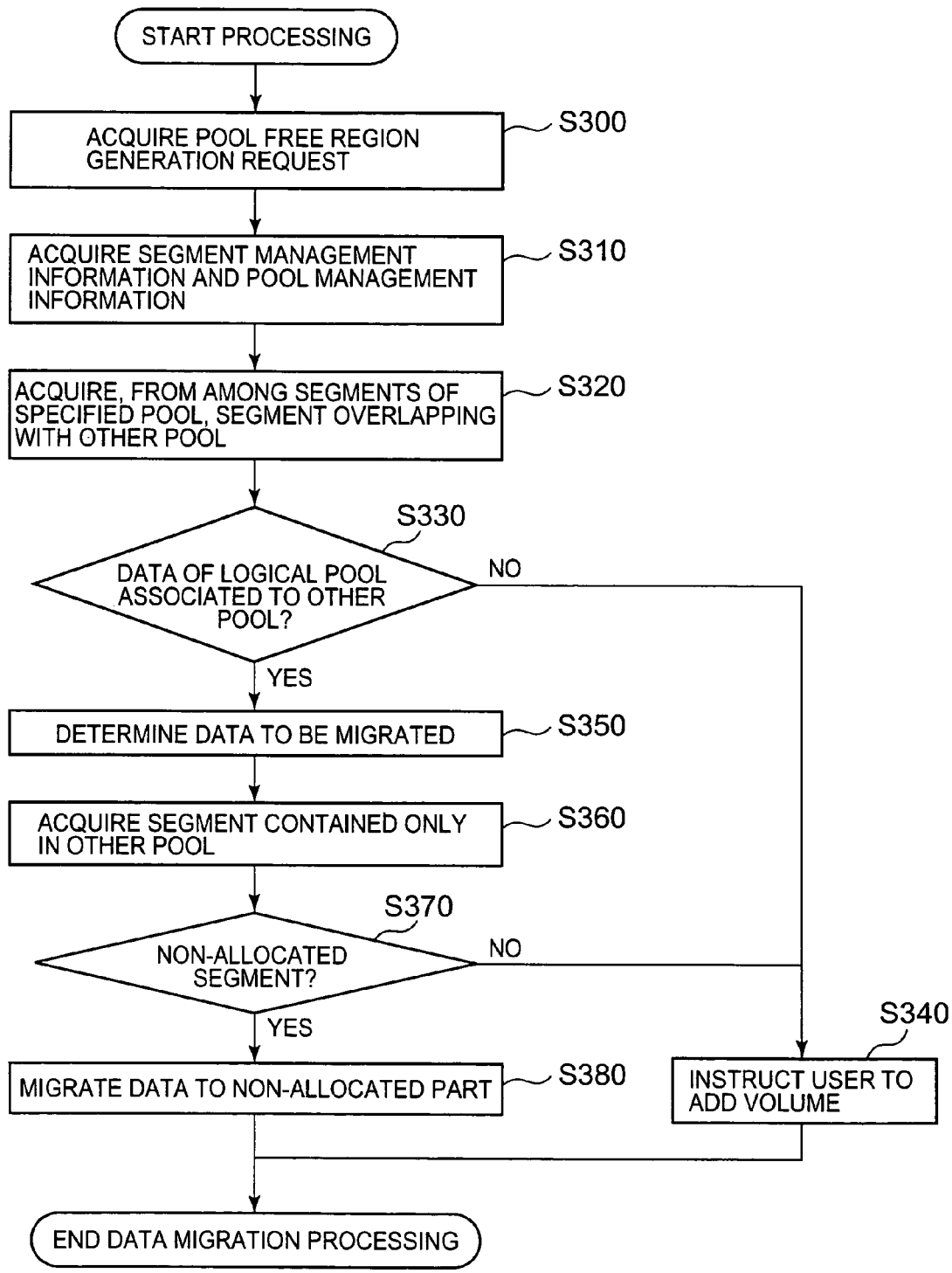
FIG. 11 shows one example of the flow of data migration processing.

Next, data migration processing will be explained in detail by referring to FIG. 11.

When the data migrating program Pa1 receives a request from a user to generate a free region in a certain pool (Step S300), it acquires segment management information and pool management information from a storage system 20 (Step S310). Furthermore, segment management information is information stored in the segment management table Tb1, and pool management information is information stored in the pool management table Tb2.

The data migration program Pa1 acquires from the segment management information and pool management information, from among the segments belonging to the pool, which the user specified for generating a free region, a list of segments, which overlap with a pool that differs from this pool (hereinafter, called "other pool") (Step S320). When a plurality of other pools exists, the same processing can be carried out for each of the other pools. More specifically, for example, the processing of Step S320 can be applied to the respective other pools.

If the data migration program Pa1 acquires a list of segments, which overlap with the other pool, it determines the segment, which is in the acquired segment list, and which is allocated to a logical volume corresponding to the other pool, by referencing the segment management information and the pool management information (Step S330). When there is such a segment (Step S330: Yes), the data migration program Pa1 determines the data inside this segment to be the migration-targeted data (Step S350). Conversely, when there is no such segment (Step S330: No), the data migration program Pa1 notifies the user to the effect that, since free space cannot be created in the specified pool, it will be necessary to add a segment (more specifically, for example, to add a disk device, or to add an existing segment that does not belong to any pool) (Step S340).

Next, the data migration program Pa1 acquires, from the segment management information and the pool management information, a list of segments contained only in the other pool (Step S360). When this segment list contains a segment, which has not been allocated to a logical volume, the data migration program Pa1 determines the non-allocated segment to be the migration-destination segment (Step S370: Yes), and can migrate data by executing the migration executing module Ma3, and instructing the data migrating module Mb3 of the control program Pb1 to migrate the data determined by the above-mentioned process to the non-allocated segment (Step S380). When there is no non-allocated segment (Step S370: No), migration cannot be performed due to the lack of a migration-destination segment, and S340 is carried out.

The preceding is an explanation of one example of the flow of data migration processing. Furthermore, when data is migrated, the control program Pb1 can update the segment management table Tb1 to reflect the state of a migration-source overlapping segment as non-allocated, and the state of a migration-destination non-overlapping segment as allocated (for example, it can record the LUN of the logical volume to which this non-overlapping segment is allocated, and the number of the pool, of which this non-overlapping segment constitutes one component, in the segment management table Tb1.). Further, in the above-mentioned example, a user can specify a pool for securing free space, and data migration processing can be executed at a variety of timings, such as when the usage rate of the pool exceeds a prescribed threshold value.

Figure 12:
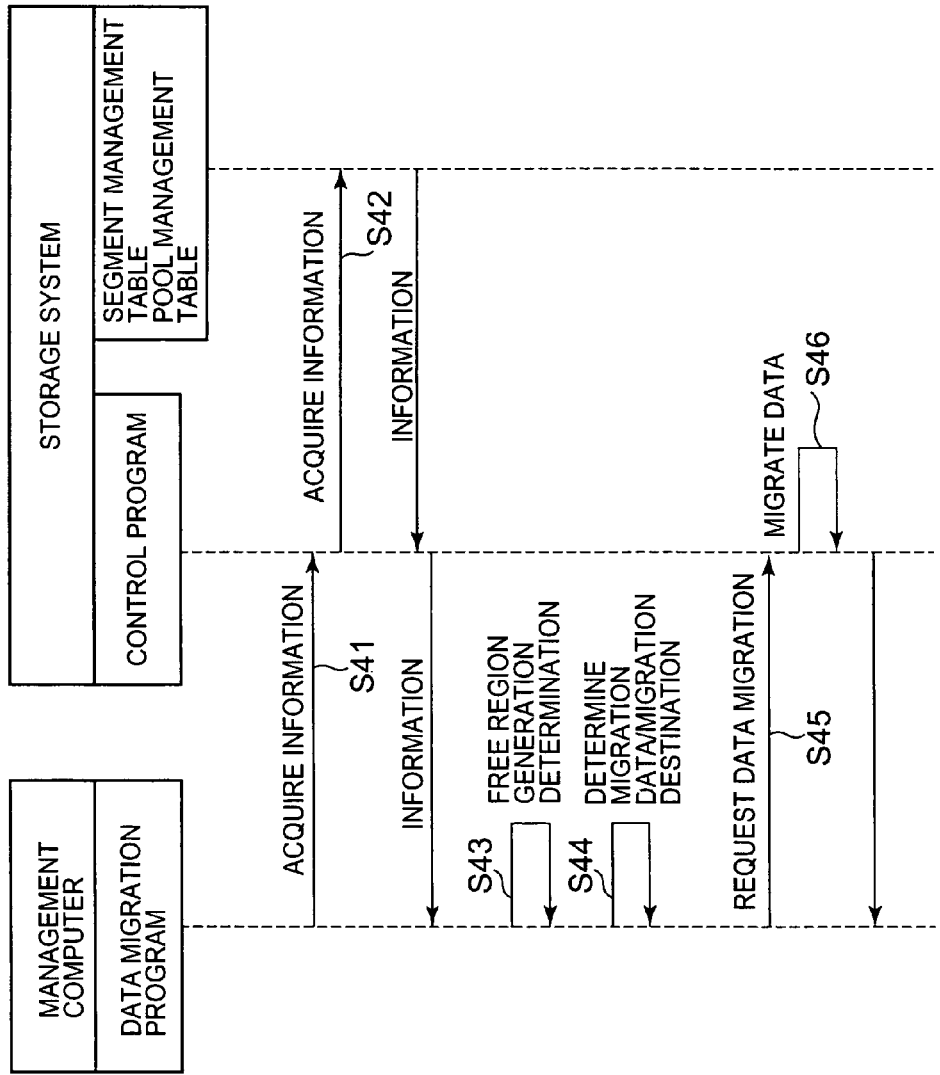
FIG. 12 shows one example of an outline of a sequence for data migration processing carried out when a free region occurs in a region, which does not overlap with another pool.

Data migration processing performed when a free region is generated in a region that does not overlap with another pool will be explained by referring to FIG. 12. This process, for example, can be executed when a free region is generated by a user adding a disk device, or when a free region is generated by emptying a segment that is allocated to a logical volume.

The data migration program Pa1 makes a request to the control program Pb1 of the storage system 20, and acquires segment management information and pool management information (Steps S41 and S42).

Next, the data migration program Pa1 acquires the usage rate of each pool from the pool management information, and compares this usage rate against the previous usage rate of the pool history management table Ta1, which is stored in the memory 12 of the management computer 10. When the results of this comparison indicate that the previous usage rate is higher, the data migration program Pa1 can determine that a free region has been generated (Step S33).

When a free region has been generated, the same processing as the above-mentioned Steps S33 through S35 can be performed (Steps S44 through S46).

Figure 13:
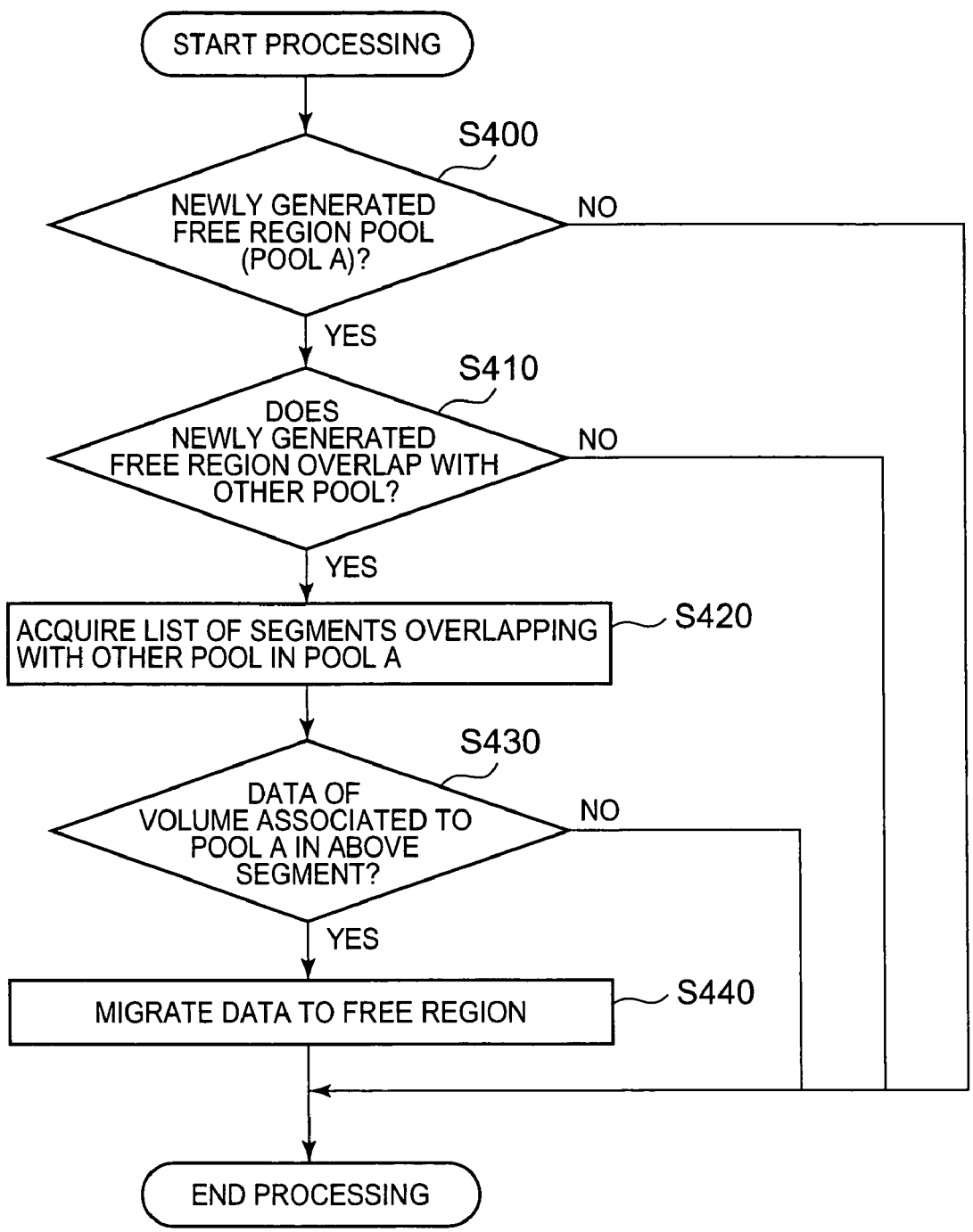
FIG. 13 shows one example of a the flow of data migration processing of FIG. 12.

Next, the data migration processing explained by referring to FIG. 12 will be explained in more detail by referring to FIG. 13.

In the above-mentioned processing, when a free region is detected (Step S400: Yes), the data migration program Pa1 determines whether or not the free region is a segment that does not overlap with another pool (Step S410). When a free region is not detected, processing is terminated as-is (Step S400: No).

When the free region is a region (segment), which does not overlap with another pool (Step S410: Yes), the data migration program Pa1 acquires a list of segments, which are in the pool in which the free region was generated, and which overlap with another pool (Step S420). When the free region overlaps with another pool (Step S410: No), the data migration program Pa1 ends processing as-is without performing data migration because the free region was generated in a region, which overlaps with a plurality of pools.

The data migration program Pa1 determines if there is data of a logical volume associated to the pool in which a free region was generated, in the list of segments, which overlap with another pool (Step S430), and when there is data, the data migration program Pa1 executes the migration executing module Ma3, and instructs the data migrating module Mb3 of the control program Pb1 to migrate data to the free region, causing the data to be migrated (Step S440). When there is no data, the data migration program Pa1 ends the processing as-is since there is no migration-targeted data (Step S430: No).

The preceding is data migration processing, which is carried out when the generation of a free region has been detected. Furthermore, when the generation of a free region is detected in a plurality of pools, this processing can be repeated and applied to the respective pools. Further, when the generation of a free region is detected in accordance with the usage rate becoming less than the previous usage rate, the control program Pb1, for example, can carry out the following processing. That is, for example, when a disk device 241 has been added, the control program Pb1 can determine the pool to which the segment of the added disk device 241 belongs, and can update the usage rate of the determined pool on the basis of the total size of the plurality of segments that have been added to this pool. Further, for example, when the control program Pb1 deletes data from a logical volume, it can determine the pool to which the segment in which this data was stored belongs, and update the usage rate of the determined pool in accordance with the size of this segment.

According to the first embodiment explained hereinabove, of the data comprising a certain pool, it is possible to migrate either part or all of the data stored in a segment, which overlaps with another pool, to a segment, which is contained only in the other pool (that is, a non-overlapping segment). This makes it possible to reduce the likelihood of an overlapping segment being exhausted.

Second Embodiment

A second embodiment of the present invention will be explained below. Furthermore, mainly the points of difference with the first embodiment will be explained hereinbelow, and explanations of the points of similarity with the first embodiment will either be omitted or simplified.

In a second embodiment, it is possible to determine to which other-pool non-overlapping segment that data, which is inside a segment overlapping two pools, is to be migrated, based on fluctuations in the trends between the respective pools and the other pool.

Figure 14:
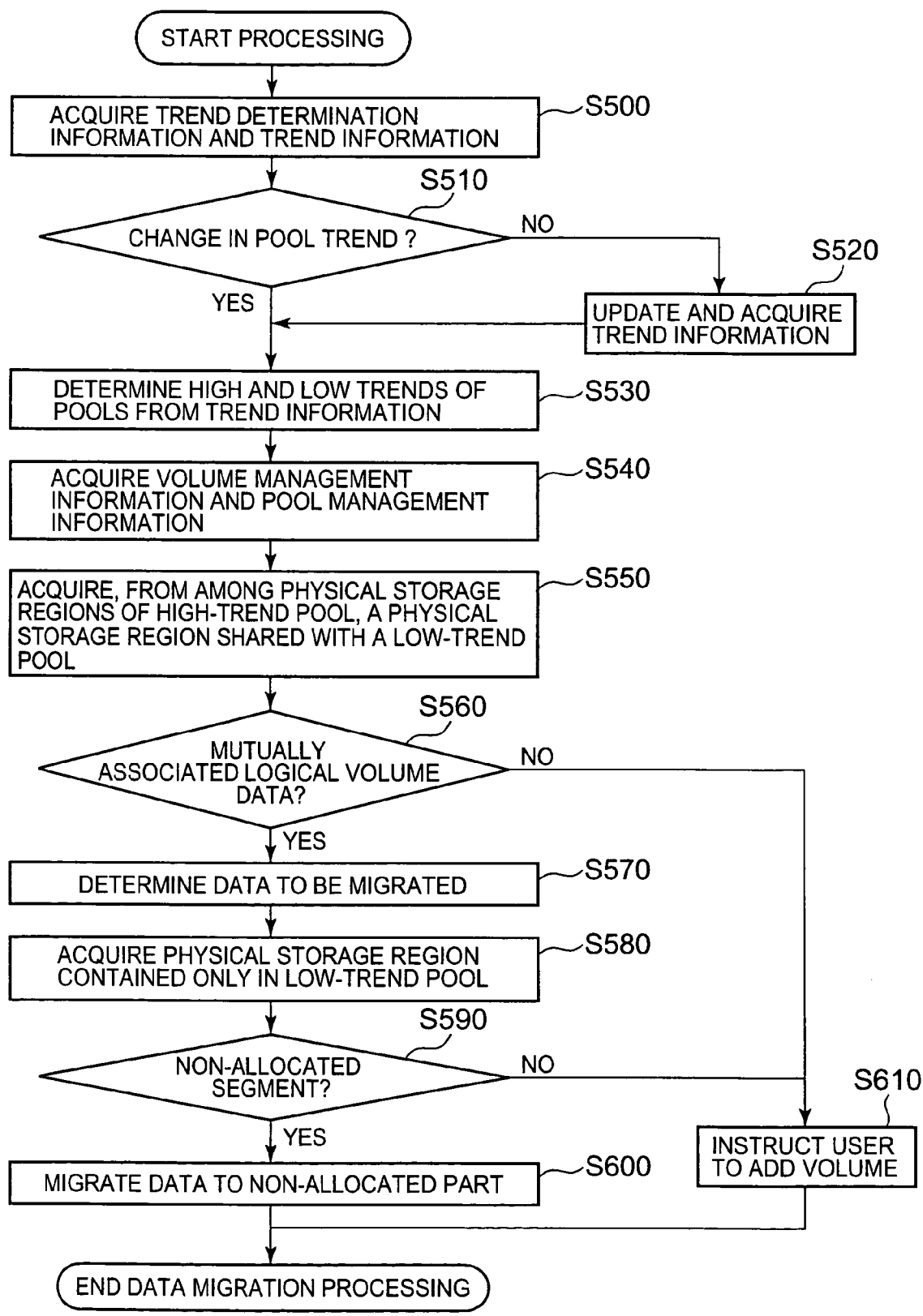
FIG. 14 shows one example of the flow of data migration processing carried out by a second embodiment of the present invention.

FIG. 14 shows one example of the flow of data migration processing carried out by the second embodiment of the present invention.

The data migration program Pa1 acquires trend information and trend determining information (Step S500). Trend information is information, which expresses the height of a trend between pools having overlapping parts. Trend determining information is information, which is utilized for determining whether or not there has been a change in the height of a trend. For example, either information related to the increase and decrease of a pool usage rate, or I/O frequency can be considered as the information of each pool recorded in the trend determining information.

The data migration program Pa1 references the trend determining information, and determines whether or not there has been a change in the height of a trend (Step S510). Here, for example, when it is recorded in the trend information that the trend of pool2 is higher than that of pool1, and the fact that the usage rate of pool1 is increasing more than that of pool2 is specified from the trend determining information, it is possible to determine that there was a change in the height of the trend between pool1 and pool2. When it is determined that there has been a change in the height of a trend, (Step S510: Yes), the data migration program Pa1 can reflect the post-change trend in the trend information (Step S520).

The data migration program Pa1 determines the tendency for trend fluctuation between pools from the trend information (Step S530). The data migration program Pa1 also acquires segment management information and pool management information (Step S540).

The data migration program Pa1, based on the results of the determination of Step S530 and the various acquired information, can specify an overlapping segment in a pool whose trend tends to be high, and in a pool whose trend tends to be low, and can migrate data stored in the specified overlapping segment to a non-overlapping segment belonging to the pool whose trend tends to be low (Steps S550 through S600).

According to this second embodiment, since it is possible to migrate data stored in an overlapping segment to a non-overlapping segment of a pool with a low trend, the free space of a pool whose trend tends to be high can be secured on a priority basis.

Furthermore, in this second embodiment, for example, the data migration program Pa1 can regularly acquire a usage rate registered in the pool management table Tb2, and can record the acquired time and the acquired usage rate for each pool in the trend determining information. In this case, it is possible to determine that a pool for which the usage rate is increasing is the pool whose trend tends to be high. Further, for example, the data migration program Pa1 can acquire the I/O frequency for each logical volume, specify a pool corresponding to the attribute of a logical volume, and record the acquired time and the acquired I/O frequency for the specified pool in the trend determining information. In this case, it is possible to determine a pool associated to the logical volume for which the I/O frequency is rising as the pool whose trend tends to be high.

A number of preferred embodiments of the present invention have been explained hereinabove, but these embodiments have been provided for the purpose of illustrating the present invention, and are not intended to limit the scope of the invention solely to these embodiments. The present invention can be implemented in various other aspects as well.

For example, as the data migration unit in the above explanations, data is migrated in segment units, but another unit can also be used.

Further, for example, there does not have to be a management computer 10. In this case, the programs and tables stored in the memory 12 of the management computer 10 can be provided in either a storage system 20 or a host computer 50.

Further, for example, when the number of non-overlapping segments is not more than a prescribed number, the data migration program Pa1 can also be controlled such that data inside an overlapping segment is not migrated.

Further, for example, as illustrated in FIG. 15, when three or more pools exist, a segment, which overlaps three or more pools (the region indicated by diagonal lines in FIG. 15), can also exist. In this case, for example, when it is desirable to empty the most overlapped part of pool1 (the aggregate of segments capable of belonging to the most pools), the data migration program Pa1 can confirm the extent of free space in the non-overlapping part of pool2, and can migrate the data inside the most overlapped part to a non-overlapping part of pool2. Further, the data migration program Pa1 can confirm the extent of free space in the non-overlapping part of pool3, and can also migrate the data inside the most overlapped part to a non-overlapping part of pool3. Furthermore, in this case, the data migration program Pa1 can control the size of the data migrated to each part-based on the size of the non-overlapping part of pool2 and the size of the non-overlapping part of pool3. For example, when the size of the non-overlapping part of pool2 is larger that the size of the non-overlapping part of pool3, a larger volume of data can be migrated to the non-overlapping part of pool2.

What is claimed is:

1. A storage system capable of communicating with a host computer, which issues a write request, said storage system comprising:
    a plurality of physical storage regions;
    a plurality of storage pools, which is constituted from two or more physical storage regions;
    a plurality of logical volumes, which is respectively associated to said plurality of storage pools; and
    a controller, which receives from said host computer a write request for a logical volume, allocates one or more physical storage regions inside a storage pool associated to said logical volume; and writes data in accordance with said received write request to said allocated one or more physical storage regions,
    wherein said plurality of physical storage regions comprises a physical storage region having one or more attributes, and a physical storage region having a plurality of attributes;
    a prescribed attribute is allocated to each of said plurality of storage pools, and said plurality of storage pools has overlapping parts, which overlap one another, and non-overlapping parts, which do not overlap one another;
    said overlapping part is an aggregate of overlapping physical storage regions constituting two or more storage pools of the plurality of storage pools, because of having the same plurality of attributes as the plurality of attributes respectively allocated to the plurality of storage pools;
    the non-overlapping part of the each storage pool is an aggregate of non-overlapping physical storage regions constituting only said each storage pool, because of having an attribute allocated to said each storage pool, and not having an attribute allocated to another storage pool; and
    said controller selects, from among a certain storage pool associated to a certain logical volume, a non-overlapping physical storage region, which is not allocated to said certain logical volume; allocates said selected non-overlapping physical storage region to said certain logical volume; migrates data inside said overlapping physical storage region allocated to said certain logical volume to said selected non-overlapping physical storage region; and releases the allocation of said migration-source overlapping physical storage region from said certain logical volume.

2. The storage system according to claim 1, wherein said certain storage pool is a separate storage pool having said overlapping part with a storage pool, which is specified by either a user of said host computer or a user of another computer, and in which free space is to be secured.

3. The storage system according to claim 1, wherein said certain storage pool is a separate storage pool having an overlapping part with a storage pool, in which the number of non-allocated physical storage regions is not more than a prescribed number.

4. The storage system according to claim 1, wherein said certain storage pool is a storage pool, in which the number of non-overlapping physical storage regions has increased.

5. The storage system according to claim 4, wherein said plurality of physical storage regions are provided in a plurality of physical storage devices, and the attribute of each physical storage region is an attribute of the physical storage device comprising the physical storage region, and when a physical storage device is newly installed, the storage pool in which the number of said non-overlapping physical storage regions has increased is detected on the basis of the attribute of said installed physical storage device.

6. The storage system according to claim 5, wherein said physical storage device is a hard disk drive, and the attribute of said physical storage device is a type of said hard disk drive.

7. The storage system according to claim 5, comprising:
two or more RAID groups, wherein
  each RAID group comprises two or more physical storage devices of said plurality of physical storage devices,
  a certain RAID level is allocated to each of said RAID groups, and
  the attribute of said physical storage device is the RAID level of the RAID group which is constituted by the physical storage device.

8. The storage system according to claim 4, wherein, when said controller deletes data stored in the non-overlapping physical storage region, the storage pool comprising the non-overlapping physical storage region in which the deleted data had been stored is detected as said storage pool in which the number of non-overlapping physical storage regions has increased.

9. The storage system according to claim 1, wherein said certain storage pool is a storage pool, which is the one determined to have a low trend, of a first and second storage pools comprising mutually overlapping parts.

10. The storage system according to claim 9, wherein, when the trend is higher for said second storage pool than for said first storage pool, it is a case of either (1) or (2) below:
  (1) when the usage rate of said second storage pool, which is the ratio of physical storage regions allocated to a physical storage region group constituting said second storage pool, has more of an upward tendency than the usage rate of said first storage pool;
  (2) when the access frequency for a second logical volume associated to said second storage pool has more of an upward tendency than the access frequency for a first logical volume associated to said first storage pool.

11. The storage system according to claim 1, wherein said controller preferentially allocates to said logical volume the non-overlapping physical storage region more than the overlapping physical storage region, of the storage pool associated to said logical volume.

12. The storage system according to claim 1, wherein said controller receives a write request for a logical volume from said host computer; preferentially allocates to said logical volume the non-overlapping physical storage region more than the overlapping physical storage region from among a storage pool associated to said logical volume; and writes data in accordance with said received write request to said allocated physical storage region.

13. A storage control method, wherein a plurality of physical storage regions comprising a physical storage region having one or more attributes, and a physical storage region having a plurality of attributes, are provided;
  a plurality of storage pools comprising two or more physical storage regions are provided,
  a prescribed attribute is allocated to each of said plurality of storage pools, and said plurality of storage pools has overlapping parts, which overlap one another, and non-overlapping parts, which do not overlap with one another,
  said overlapping part is an aggregate of overlapping physical storage regions constituting all of said plurality of storage pools, because of having the same plurality of attributes as the plurality of attributes respectively allocated to a plurality of storage pools, and
  the non-overlapping part of each storage pool is an aggregate of non-overlapping physical storage regions constituting only said each storage pool, because of having an attribute which is allocated to said each storage pool, and not having an attribute which is allocated to another storage,
  said storage control method comprising the steps of:
  receiving from a host computer a write request for any of a plurality of logical volumes;
  selecting one or more physical storage regions from a storage pool associated to a logical volume, which is to be the write destination of data in accordance with said write request;
  allocating said selected one or more physical storage regions to the logical volume, which is to be the write destination of said data;
  writing said data to said allocated one or more physical storage regions;
  selecting, from among a certain storage pool associated to a certain logical volume, a non-overlapping physical storage region, which is not allocated to said certain logical volume;
  allocating said selected non-overlapping physical storage region to said certain logical volume;
  migrating the data inside said overlapping physical storage region, which is allocated to said certain logical volume, to said selected non-overlapping physical storage region; and
  releasing the allocation of said migration-source overlapping physical storage region from said certain logical volume.

14. The storage control method according to claim 13, wherein said certain storage pool is a separate storage pool having said overlapping part with a storage pool, which is specified by a user of either said host computer or another computer and in which free space is to be secured.

15. The storage control method according to claim 13, wherein said certain storage pool is a separate storage pool having an overlapping part with a storage pool, in which the number of non-allocated physical storage regions is not more than a prescribed number.

16. The storage control method according to claim 13, wherein said certain storage pool is a storage pool in which the number of non-overlapping physical storage regions has increased.

17. The storage control method according to claim 16, wherein said plurality of physical storage regions are provided in a plurality of physical storage devices, and the attribute of each physical storage region is the same as the attribute of the physical storage device comprising the physical storage region, and when a physical storage device is newly installed, the storage pool in which the number of said non-overlapping physical storage regions has increased is detected on the basis of the attribute of said installed physical storage device.

18. The storage control method according to claim 16, wherein when data stored in said non-overlapping physical storage region is deleted, the storage pool comprising the non-overlapping physical storage region in which the deleted data had been stored, is detected as said storage pool in which the number of non-overlapping physical storage regions has increased.

19. The storage control method according to claim 13, further comprising the steps of:
- receiving a write request from said host computer for a logical volume;
- preferentially allocating to said logical volume, from among a storage pool associated to said logical volume, a non-overlapping physical storage region more than an overlapping physical storage region; and
- writing to said allocated physical storage region data in accordance with said received write request.

20. A storage system capable of communicating with a host computer, which issues a write request, said storage system comprising:
- a plurality of physical storage regions provided in a plurality of physical storage devices;
- a plurality of storage pools constituted from two or more physical storage regions;
- a plurality of logical volumes respectively associated to said plurality of storage pools; and
- a controller,
- wherein said plurality of physical storage regions comprises a physical storage region having one or more attributes, and a physical storage region having a plurality of attributes;
- the attribute of each physical storage region is an attribute of the physical storage device comprising that physical storage region;
- a prescribed attribute is allocated to each of said plurality of storage pools, and said plurality of storage pools has overlapping parts, which overlap one another, and non-overlapping parts, which do not overlap with one another, and
- said overlapping part is an aggregate of overlapping physical storage regions constituting all of said plurality of storage pools, because of having the same plurality of attributes as the plurality of attributes respectively allocated to a plurality of storage pools, and
- the non-overlapping part of each storage pool is an aggregate of non-overlapping physical storage regions constituting only said each storage pool, because of having an attribute which is allocated to said each storage pool, and not having an attribute which is allocated to another storage pool,
- wherein said controller:
- receives a write request from said host computer for a logical volume;
- preferentially allocates to said logical volume, from among the storage pool associated to said logical volume, the non-overlapping physical storage region more than the overlapping physical storage region; and
- writes to said allocated physical storage region data in accordance with said received write request, and
- when at least one of the following situations occurs:
  - (A) a user of either said host computer or another computer specifies a storage pool for which free space is to be secured;
  - (B) a storage pool in which the number of non-allocated physical storage regions is not more than a prescribed number is detected; and
  - (C) a storage pool in which the number of non-overlapping physical storage regions has increased is detected as a result of either a physical storage device being newly installed, or data stored in a non-overlapping physical storage region being deleted,
- said controller selects a non-overlapping physical storage region, which is not allocated to a certain logical volume, from among a certain storage pool associated to said certain logical volume;
- allocates said selected non-overlapping physical storage region to said certain logical volume;
- migrates data inside said overlapping physical storage region allocated to said certain logical volume to said selected non-overlapping physical storage region; and
- releases the allocation of said migration-source overlapping physical storage region from said certain logical volume,
- and wherein said certain storage pool is at least one of:
  - (a) a separate storage pool having said overlapping part with said specified storage pool;
  - (b) a separate storage pool having said overlapping part with a storage pool, in which the number of non-allocated physical storage regions is not more than a prescribed number; and
  - (c) a storage pool in which the number of non-overlapping physical storage regions has increased.

* * * * *